United States Patent
Lyu et al.

(10) Patent No.: US 11,320,332 B2
(45) Date of Patent: May 3, 2022

(54) FIRST HARMONIC RUNOUT SIMULATION HUB

(71) Applicant: CITIC Dicastal CO., LTD., Hebei (CN)

(72) Inventors: Jinqi Lyu, Qinhuangdao (CN); Zhigao Yin, Qinhuangdao (CN); Hanbao Sun, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 242 days.

(21) Appl. No.: 16/548,838

(22) Filed: Aug. 22, 2019

(65) Prior Publication Data
US 2020/0271536 A1 Aug. 27, 2020

(30) Foreign Application Priority Data
Feb. 27, 2019 (CN) .......................... 201910147564.0

(51) Int. Cl.
*G01M 1/04* (2006.01)
*G01M 1/08* (2006.01)

(52) U.S. Cl.
CPC .............. *G01M 1/04* (2013.01); *G01M 1/045* (2013.01); *G01M 1/08* (2013.01)

(58) Field of Classification Search
CPC ........... G01M 1/04; G01M 1/045; G01M 1/08
See application file for complete search history.

(56) References Cited

U.S. PATENT DOCUMENTS

| 5,974,878 A | 11/1999 | Newell |
| 6,035,507 A * | 3/2000 | Bianchi .................. F16D 65/12 188/18 A |
| 6,101,911 A | 8/2000 | Newell |
| 6,415,508 B1 * | 7/2002 | Laps ........................ B23B 5/02 29/894.36 |
| 10,495,539 B2 | 12/2019 | Lv et al. |
| 2004/0010916 A1 | 1/2004 | Mazur |

(Continued)

FOREIGN PATENT DOCUMENTS

JP   11083408 A   *  3/1999

OTHER PUBLICATIONS

Sun Hanbao, Lv Jingi. Study on Calibration Methods for Aluminum Wheel Runout Tester. Engineering & Test, vol. 53. No. 4 Dec. 2013.

(Continued)

*Primary Examiner* — Paul M. West
(74) *Attorney, Agent, or Firm* — Syncoda LLC; Feng Ma

(57) ABSTRACT

A first harmonic runout simulation hub includes a measuring disc and a clamping portion detachably fixed together, in which the clamping portion is fixed in the middle of the measuring disc; the clamping portion includes a first positioning hole for positioning and clamping, the first positioning hole is a cylindrical hole, and the cylindricity of the first positioning hole is smaller than a preset value; the outer circumference of the measuring disc includes a measuring cylindrical surface having a preset axial length and a bus parallel to an axis of the first positioning hole, the radial distance between the axis of the measuring cylindrical surface and the axis of the first positioning hole is greater than a preset value, and circular runout test values on the measuring cylindrical surface are preset first harmonic runout values.

6 Claims, 4 Drawing Sheets

(56) References Cited

U.S. PATENT DOCUMENTS

| | | |
|---|---|---|
| 2019/0033159 A1 | 1/2019 | Lv et al. |
| 2020/0271443 A1 | 8/2020 | Lyu et al. |
| 2020/0271444 A1 | 8/2020 | Lyu et al. |
| 2020/0271536 A1 | 8/2020 | Lyu et al. |
| 2020/0271537 A1 | 8/2020 | Lyu et al. |

OTHER PUBLICATIONS

First Office Action of the U.S. Appl. No. 16/550,487, dated Mar. 23, 2021.
First Office Action of the U.S. Appl. No. 16/552,396, dated Mar. 23, 2021.

* cited by examiner

FIRST HARMONIC RUNOUT SIMULATION HUB

CROSS-REFERENCE TO RELATED APPLICATIONS

The present application claims benefit of Chinese Application No. 201910147564.0, filed on Feb. 27, 2019, the disclosure of which is hereby incorporated by reference in its entirety.

BACKGROUND

The motor vehicle hub (hereinafter referred to as the hub) is deformed during machining and heat treatment to cause a deviation in the shape of the hub. One of the common deviations is certain eccentric distance between the axis of rotation of the hub and the axis of the outer circumference of the hub. After the hub has the eccentric distance deviation, the outer circumference of the hub has a maximum runout value (peak value) and a minimum runout value (trough value) in one rotating circumference. Such circular runout having a peak value and a trough value in one rotating circumference is referred to as first harmonic runout in engineering, and the quality of the hub is evaluated based on this. If a motor vehicle is mounted with the hubs having first harmonic runout too large, the motor vehicle may bump or swing during driving, which is not safe and comfortable for a user. Thus, runout tests are required for ordinary hub products, and hub manufacturers are also equipped with motor vehicle hub runout testers special for testing motor vehicle hub runout.

The motor vehicle hub runout testers include contact and non-contact ones according to the test methods. The contact test principle indicates that a measuring component is used to be in contact with an inner or outer bead seat of a tested hub, and when the hub rotates, the runout of the inner or outer bead seat is transmitted to a displacement sensor through the measuring component, thereby realizing a hub runout test. The non-contact runout tester uses laser as a test source, the laser is directly projected onto an inner or outer bead seat of a tested hub, and the reflected light is tested to calculate the amount of runout when the hub rotates.

However, since all the hubs need to be tested, the test amount is relatively large. Either type of motor vehicle hub tester is gradually worn during use to lose the test accuracy. Accordingly, a standard hub (i.e., a defective product) having determined first harmonic runout values is required for verifying the accuracy and stability of first harmonic runout of the runout tester to ensure that the test data of the runout tester is accurate and reliable. At the same time, when test comparison is required for different hub runout testers, a standard hub having determined first harmonic runout values is also required to complete the comparison of first harmonic runout test results between different devices.

However, the verification directly using the real hub has the following problems:

1) Ordinary hubs are produced in mass with relatively stable quality, and it is difficult to find a hub having determined first harmonic runout values that are relatively large;

2) After the standard hub made of an ordinary hub is tested multiple times on the runout tester, the first harmonic runout value is easily changed due to wear, resulting in inaccurate verification;

3) The standard hub made of the ordinary hub is easily confused with the ordinary hub and flows into next procedure after verification, resulting in the loss of the standard hub and the introduction of defective products into the next procedure.

SUMMARY

The present disclosure relates to a motor vehicle wheel manufacturing technology, in particular to a first harmonic runout simulation hub.

In view of this, the present disclosure is directed to provide a first harmonic runout simulation hub, which can accurately verify a runout tester, has a simple structure and a long service life, and is not confused with an ordinary motor vehicle hub.

In order to achieve the above objective, the technical solution of the present disclosure is implemented as follows:

A first harmonic runout simulation hub, including a measuring disc and a clamping portion detachably fixed together, in which the clamping portion is fixed in the middle of the measuring disc; the clamping portion includes a first positioning hole for positioning and clamping, the first positioning hole is a cylindrical hole, and the cylindricity of the first positioning hole is smaller than a preset value; the outer circumference of the measuring disc includes a measuring cylindrical surface having a preset axial length and a bus parallel to an axis of the first positioning hole, the radial distance between the axis of the measuring cylindrical surface and the axis of the first positioning hole is greater than a preset value, and circular runout test values on the measuring cylindrical surface are preset first harmonic runout values.

In the above solution, the measuring disc further includes an end plate arranged only at one end of the measuring cylindrical surface, and the end plate is integrally formed with the measuring cylindrical surface.

In the above solution, the clamping portion further includes a boss assembled with the end plate, the end plate includes a second positioning hole matching the boss, and after the boss is mounted into the second positioning hole, the parallelism between the bus of the measuring cylindrical surface and the axis of the first positioning hole is smaller than a preset value.

In the above solution, the clamping portion further includes an end face positioning surface, the end face positioning surface is at one end of the clamping portion, and the perpendicularity between the end face positioning surface and the axis of the first positioning hole is smaller than a preset value.

In the above solution, the clamping portion further includes at least two threaded holes, the axes of the threaded holes are in the same direction as the axis of the first positioning hole, and the end plate further includes screw through holes matching the threaded holes; the clamping portion and the end plate are fixed as follows: after the boss is assembled with the second positioning hole, screws are passed through the screw through holes and screwed into the threaded holes for fixing.

In the above solution, the end plate is provided with at least two lightening holes uniformly distributed along the circumference, and the radial distances between the lightening holes and the measuring cylindrical surface are greater than a preset value.

The first harmonic runout simulation hub according to the embodiments of the present disclosure includes a measuring disc and a clamping portion detachably fixed together, in which the clamping portion is fixed in the middle of the measuring disc; the clamping portion includes a first positioning hole for positioning and clamping, the first positioning hole is a cylindrical hole, and the cylindricity of the first positioning hole is smaller than a preset value; the outer circumference of the measuring disc includes a measuring cylindrical surface having a preset axial length and a bus parallel to an axis of the first positioning hole, the radial distance between the axis of the measuring cylindrical surface and the axis of the first positioning hole is greater than a preset value, and circular runout test values on the measuring cylindrical surface are preset first harmonic runout values. Hence, the first harmonic runout simulation hub according to the embodiments of the present disclosure can accurately verify a runout tester, has a simple structure and a long service life, and is not confused with an ordinary motor vehicle hub.

Other advantageous effects of the embodiments of the present disclosure will be further described in conjunction with specific technical solutions in the specific embodiments.

DETAILED DESCRIPTION

Figure 1:
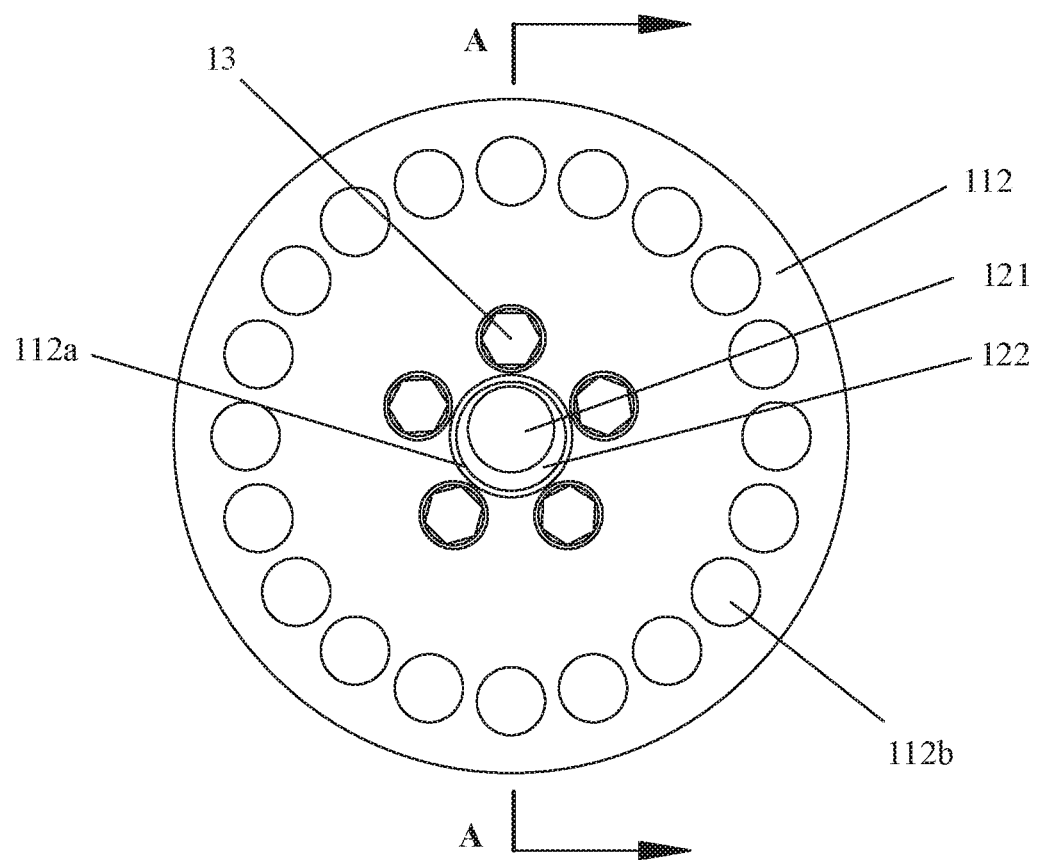
FIG. 1 is a schematic diagram of a first harmonic runout simulation hub according to an embodiment of the present disclosure.

It should be noted that, the terms "first\second\third" involved in the embodiments of the present disclosure are only intended to distinguish similar objects, but do not represent specific orders of the objects, and understandably, the "first/second/third" may be interchanged in a specific order or consecutive.

Embodiments of the present disclosure provide a first harmonic runout simulation hub, including a measuring disc and a clamping portion detachably fixed together, in which the clamping portion is fixed in the middle of the measuring disc; the clamping portion includes a first positioning hole for positioning and clamping, the first positioning hole is a cylindrical hole, and the cylindricity of the first positioning hole is smaller than a preset value; the outer circumference of the measuring disc includes a measuring cylindrical surface having a preset axial length and a bus parallel to an axis of the first positioning hole, the radial distance between the axis of the measuring cylindrical surface and the axis of the first positioning hole is greater than a preset value, and circular runout test values on the measuring cylindrical surface are preset first harmonic runout values.

The measuring cylindrical surface is a surface for measuring circular runout; the simulation hub is fixed to a motor vehicle hub runout tester through the first positioning hole, the motor vehicle hub runout tester may be provided with a clamp including an expansion column, and the expansion column is inserted into the first positioning hole and then expands to clamp the simulation hub.

The cylindricity of the first positioning hole is smaller than a preset value, so that the positioning is more accurate; the axial length of the measuring cylindrical surface is preset to facilitate the contact with a measuring head for measuring the circular runout; the circular runout test values on the measuring cylindrical surface are all preset first harmonic runout values, that is, the simulation hub is a defective product, which is caused by the fact that the axis of the measuring cylindrical surface is inconsistent with the axis of rotation of the measuring cylindrical surface (because the axis of rotation is determined by the axis of the first positioning hole), that is, the simulation hub simulates an unqualified hub of which the axis of the outer circumference is different from the axis of rotation, so that a motor vehicle hub runout tester can be verified; in practice, the motor vehicle hub is also designed with a mounting hole for mounting to an axle of a motor vehicle, and like the first positioning hole, the mounting hole also has the deviation of misalignment with the outer circumference of the hub, so the structural principle of the simulation hub according to the embodiments of the present disclosure is identical to that of the real motor vehicle hub.

The first harmonic runout simulation hub according to the embodiments of the disclosure can accurately verify the runout tester, has a simple structure and a long service life, and is not confused with an ordinary motor vehicle hub. Moreover, the first harmonic runout simulation hub according to the embodiments of the present disclosure is further improved in shape, from approximately two measuring cylindrical surfaces of an ordinary hub to one measuring cylindrical surface, without a measuring vertical surface, so that the simulation hub is more convenient to manufacture and high in manufacturing precision and structural strength, the weight of the simulation hub is reduced, the verification is more accurate, and the service life of the simulation hub is prolonged. In addition, the structure of only one measuring cylindrical surface expands the movement space of the measuring head of the runout tester, so that the operation is more convenient.

Further, in actual use, the accuracy of the motor vehicle hub runout tester can be verified by using the simulation hub including only one measuring cylindrical surface and detecting only the radial circular runout, so the first harmonic runout simulation hub provided by the embodiments of the present disclosure is more practical.

The present disclosure will be described in detail below with reference to the accompanying drawings and specific embodiments. It should be understood that the specific embodiments described herein are merely used for interpreting the present disclosure, rather than limiting the present disclosure.

Figure 2:
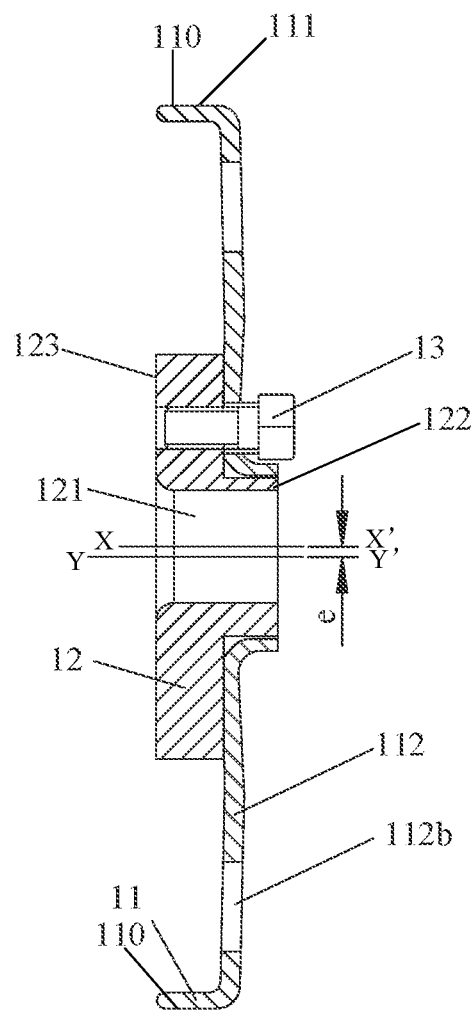
FIG. 2 is a schematic diagram of FIG. 1 in the A-A direction.

FIG. 1 is a schematic diagram of a first harmonic runout simulation hub according to an embodiment of the present disclosure, and FIG. 2 is a schematic diagram of FIG. 1 in A-A direction. As shown in FIG. 1 and FIG. 2, the first harmonic runout simulation hub includes a measuring disc 11 and a clamping portion 12 detachably fixed together, in which the clamping portion 12 is fixed in the middle of the measuring disc 11; the clamping portion 12 includes a first positioning hole 121 for positioning and clamping, the first positioning hole 121 is a cylindrical hole, and the first positioning hole 121 is used for matching a clamp of a motor vehicle hub runout tester; the cylindricity of the first positioning hole 121 is smaller than a preset value to achieve accurate positioning; the outer circumference of the measuring disc 11 includes a measuring cylindrical surface 111 having a preset axial length and a generatrix 110 parallel to an axis X-X' of the first positioning hole 121, the radial distance between the axis Y-Y' of the measuring cylindrical surface 111 and the axis X-X' of the first positioning hole 121 is e, circular runout test values on the measuring cylindrical surface 111 are preset first harmonic runout values, that is, the measuring cylindrical surface 111 is a surface for measuring radial circular runout of the simulation hub, the simulation hub is a defective product, which is caused by the fact that the axis Y-Y' of the measuring cylindrical surface 111 is inconsistent with the axis of rotation of the measuring cylindrical surface 111 (because the axis of rotation is determined by the axis X-X' of the first positioning hole 121), that is, the simulation hub simulates an unqualified hub of which the axis of the outer circumference is different from the axis of rotation, so that the motor vehicle hub runout tester can be verified.

Here, the value of e must be greater than a preset value. The preset value is to ensure a large enough difference between a peak value and a trough value of radial runout of the simulation hub in a rotating circumference, so that the radial circular runout test values of the simulation hub are preset first harmonic runout values to achieve the purpose of verifying the runout tester. In this embodiment, the value of e is preferably 1 to 2 mm.

In this embodiment, the measuring disc 11 further includes an end plate 112 arranged only at one end of the measuring cylindrical surface 111, and the end plate 112 is integrally formed with the measuring cylindrical surface 111; specifically, they may be formed by stamping, so that they are more convenient to manufacture and have certain strength; it can be understood that the end plate 112 may also be arranged at two ends of the measuring cylindrical surface 111.

In this embodiment, the clamping portion 12 further includes a boss 122 assembled with the end plate 112, the end plate 112 includes a second positioning hole 112a matching the boss 122, and after the boss 122 is mounted into the second positioning hole 112a, the parallelism between the generatrix 110 of the measuring cylindrical surface 111 and the axis X-X' of the first positioning hole 121 is smaller than a preset value, which puts forward requirements for the sizes, shapes and positions of the boss 122 and the second positioning hole 112a. In this way, the clamping portion 12 and the end plate 112 are assembled more easily, and are positioned more accurately. The mounting portion 12 and the end plate 112 are mounted and fixed by hole shaft fit, which not only ensures the mounting accuracy (mainly positioning accuracy), but also simplifies the machining mode, so this embodiment is a preferred one.

Figure 3:
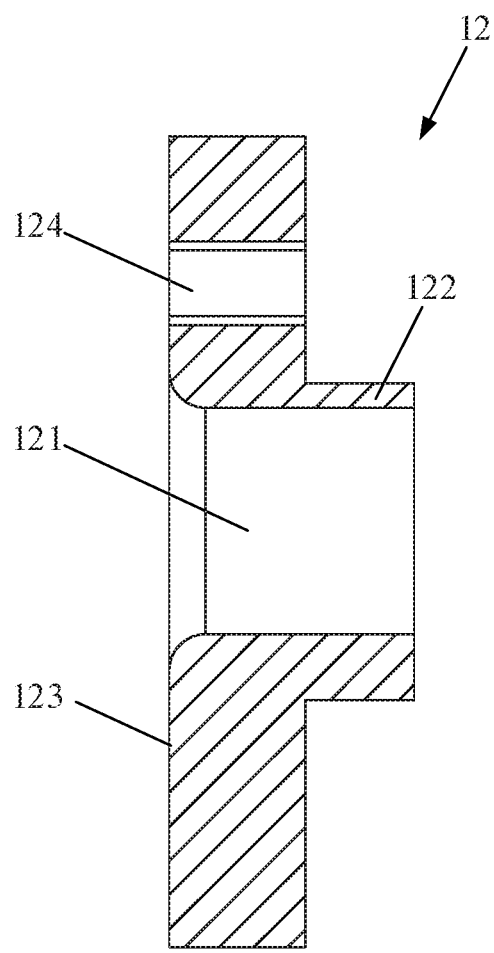
FIG. 3 is a schematic diagram of a clamping portion in the first harmonic runout simulation hub according to an embodiment of the present disclosure.

In this embodiment, as shown in FIG. 3, the clamping portion 12 further includes an end face positioning surface 123 matching the runout tester, the end face positioning surface 123 is at one end of the clamping portion 12, and the perpendicularity between the end face positioning surface 123 and the axis X-X' of the first positioning hole 121 is smaller than a preset value, that is, good perpendicularity causes the simulation hub to be positioned more accurately. Based on the positioning of the first positioning hole 121, the end face positioning surface 123 is added, so that the positioning is more reliable. It can be understood that if the cylindricity of the first positioning hole 121 and the parallelism with the measuring cylindrical surface 111 meet the preset requirements, accurate positioning can also be achieved by only the first positioning hole 121.

In this embodiment, the clamping portion 12 further includes at least two threaded holes 124, the axes of the threaded holes 124 are in the same direction as the axis X-X' of the first positioning hole 121, and the end plate 112 further includes screw through holes matching the threaded holes 124; the clamping portion 12 and the end plate 112 are fixed as follows: after the boss 122 is assembled with the second positioning hole 112a, screws 13 are passed through the screw through holes and screwed into the threaded holes 124 for fixing. This is simple to fix and easy to assemble and disassemble. The numbers of the threaded holes 124 and the screw through holes in this embodiment are preferably five.

In this embodiment, the end plate 112 is provided with at least two lightening holes 112b uniformly distributed along the circumference, and the radial distances between the lightening holes 112b and the measuring cylindrical surface 111 are greater than a preset value to ensure the strength of the simulation hub. In this way, the simulation hub is prevented from being too heavy to increase the load of the motor vehicle hub runout tester, and the too heavy simulation hub easily causes the clamp to loosen and deviate. The number of the lightening holes 112b in this embodiment is preferably 20.

Figure 4:
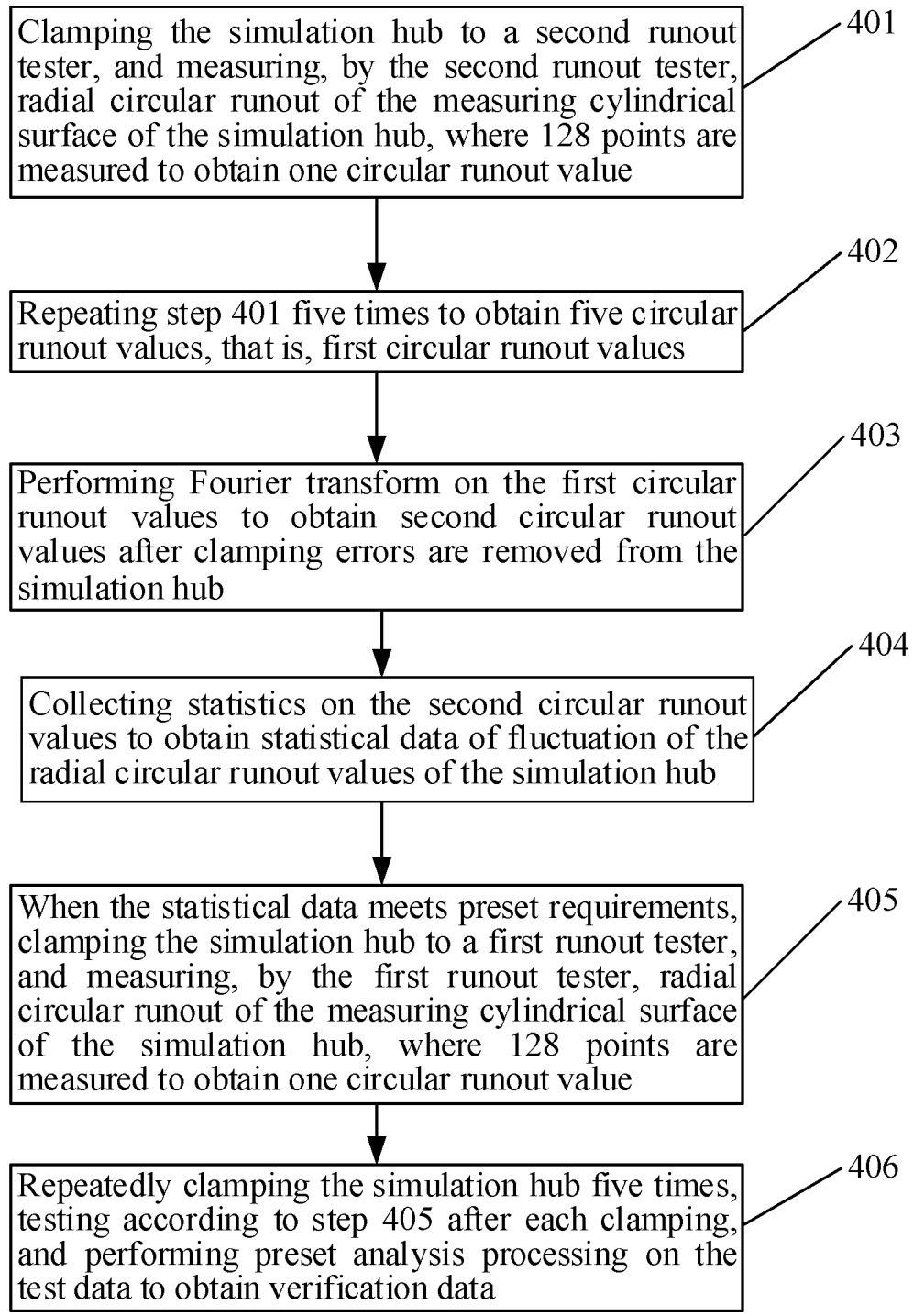
FIG. 4 is a schematic flowchart of a using method of the first harmonic runout simulation hub according to an embodiment of the present disclosure.

In order to further understand the first harmonic runout simulation hub according to the embodiments of the present disclosure, the following describes a using method of the first harmonic runout simulation hub:

FIG. 4 is a schematic flowchart of a using method of the first harmonic runout simulation hub according to an embodiment of the present disclosure. As shown in FIG. 4, the method includes the following steps:

In step 401, the simulation hub is clamped to a second runout tester, and the second runout tester measures radial circular runout of the measuring cylindrical surface of the simulation hub, where 128 points are measured to obtain one circular runout value;

In step 402, step 401 is repeated five times to obtain five circular runout values, that is, first circular runout values; because of many measurement points and multiple tests, more accurate test data can be obtained;

In step 403, Fourier transform is performed on the first circular runout values to obtain second circular runout values after clamping errors are removed from the simulation hub; the clamping errors refer to errors caused by inaccurate positioning in clamping;

In step 404, statistics on the second circular runout values are collected to obtain statistical data of fluctuation of the radial circular runout values of the simulation hub; specifically, the fluctuation is a sine curve, the specific analysis method is a runoff harmonic analysis method, which is a common method for analyzing circular runout of a motor vehicle hub, details are not described herein, and reference may be made to the paper "Research on Calibration Method for Aluminum Alloy Hub Runout Tester" in the Journal "Engineering and Testing" in 2013 Issue 04;

In step 405, when the statistical data meets preset requirements, the simulation hub is clamped to a first runout tester, and the first runout tester measures radial circular runout of the measuring cylindrical surface of the simulation hub, where 128 points are measured to obtain one circular runout value;

In step 406, the simulation hub is repeatedly clamped five times and tested according to step 405 after each clamping, and preset analysis processing is performed on the test data to obtain verification data; similar to step 404, the verification data also reflects the fluctuation of circular runout of the simulation hub, and is a sine curve; here, the measurements after multiple times of clamping can verify the measurement accuracy of the first runout tester, and can also verify the clamping reliability of the first runout tester.

Through the above method, the simulation hub can accurately verify the runout tester, has a simple structure and a long service life, and is not confused with an ordinary motor vehicle hub.

The foregoing descriptions are merely preferred embodiments of the present disclosure, but are not intended to limit the protection scope of the present disclosure. Any modifications, equivalent substitutions, improvements and the like made within the spirit and principle of the present disclosure shall fall within the protection scope of the present disclosure.

The invention claimed is:

1. A first harmonic runout simulation hub, wherein the simulation hub comprises a measuring disc and a clamping portion detachably fixed together, wherein the clamping portion is fixed in a middle of the measuring disc; the clamping portion comprises a first positioning hole for positioning and clamping, the first positioning hole is a cylindrical hole, the first positioning hole is configured to match a clamp of a motor vehicle hub runout tester, and a cylindricity error of the first positioning hole is smaller than a preset value; an outer circumference of the measuring disc comprises a measuring cylindrical surface having a preset axial length and a generatrix parallel to a central axis of the first positioning hole, a radial distance between a central axis of the measuring cylindrical surface and the central axis of the first positioning hole is greater than a preset value, and circular runout test values on the measuring cylindrical surface are preset first harmonic runout values.

2. The first harmonic runout simulation hub according to claim 1, wherein the measuring disc further comprises an end plate arranged only at one end of the measuring cylindrical surface, and the end plate is integrally formed with the measuring cylindrical surface.

3. The first harmonic runout simulation hub according to claim 2, wherein the clamping portion further comprises a boss assembled with the end plate, the end plate comprises a second positioning hole matching the boss, and after the boss is mounted into the second positioning hole, a parallelism error between the generatrix of the measuring cylindrical surface and the central axis of the first positioning hole is smaller than a preset value.

4. The first harmonic runout simulation hub according to claim 3, wherein the clamping portion further comprises an end face positioning surface, the end face positioning surface is at one end of the clamping portion, and a perpendicularity error between the end face positioning surface and the central axis of the first positioning hole is smaller than a preset value.

5. The first harmonic runout simulation hub according to claim 4, wherein the clamping portion further comprises at least two threaded holes, axes of the threaded holes are in a same direction as the central axis of the first positioning hole, and the end plate further comprises screw through holes matching the threaded holes; the clamping portion and the end plate are fixed as follows: after the boss is assembled with the second positioning hole, screws are passed through the screw through holes and screwed into the threaded holes for fixing.

6. The first harmonic runout simulation hub according to claim 5, wherein the end plate is provided with at least two lightening holes uniformly distributed along a circumference, and radial distances between the lightening holes and the measuring cylindrical surface are greater than a preset value.

* * * * *